United States Patent [19]

Buggle et al.

[11] Patent Number: 5,454,149
[45] Date of Patent: Oct. 3, 1995

[54] PALETTE CHANGER FOR MACHINE TOOLS

[75] Inventors: Guenther Buggle, Villingen-Schwenningen; Willi Schuetz, Weiden-Dornhan, both of Germany

[73] Assignee: Bernhard Steinel Werkzeugmaschinenfabrik GmbH & Co., Villingen-Schwenningen, Germany

[21] Appl. No.: 296,108

[22] Filed: Aug. 25, 1994

[30] Foreign Application Priority Data

Sep. 11, 1993 [DE] Germany .................. 43 30 915.1

[51] Int. Cl.⁶ ................... B23Q 7/14; B65G 37/00
[52] U.S. Cl. .............. 29/33 P; 198/346.1; 198/465.1
[58] Field of Search .................. 29/33 P, 563; 198/346.1, 465.1, 346.2, 345.3; 104/48

[56] References Cited

U.S. PATENT DOCUMENTS

| | | | |
|---|---|---|---|
| 4,717,306 | 1/1988 | Satake | 198/346.1 X |
| 4,799,582 | 1/1989 | Itoh | 198/346.1 |
| 4,989,717 | 2/1991 | Itoh | 198/346.1 |
| 4,997,078 | 3/1991 | Itoh | 198/465.1 X |
| 5,259,494 | 11/1993 | Hirose | 29/33 P X |
| 5,368,150 | 11/1994 | Okada et al. | 29/33 P X |

FOREIGN PATENT DOCUMENTS

| | | |
|---|---|---|
| 0000874 | 3/1979 | European Pat. Off. . |
| 0366791 | 5/1990 | European Pat. Off. . |
| 0281664 | 10/1992 | European Pat. Off. . |
| 3134833 | 6/1982 | Germany . |
| 201987 | 8/1983 | Germany . |
| 3605470 | 8/1986 | Germany . |
| 4236416 | 5/1993 | Germany . |
| 8810169 | 12/1988 | Japan .................. 198/346.1 |
| 620420 | 7/1978 | U.S.S.R. .................. 198/346.1 |

OTHER PUBLICATIONS

Patent Abstracts of Japan, vol. 9, No. 290, Nov. 16, 1985.

*Primary Examiner*—William Briggs
*Attorney, Agent, or Firm*—Dominik & Stein

[57] ABSTRACT

A palette changer for work tool machines, wherein a palette (44) is pushed by means of a swing arm (42) from the palette receiver (20) of a sled (14) over a bridge table (28) onto a transfer station (50). The sweeping movement of the swing arm (42) is driven by means of a pinion (38) which engages a fixed rack (24). The bridge table (28) is transported along with the sled (14) so that the palette guide (22 or 30) of the sled (14) and the bridge table (28) during the sliding of the sled (14) are constantly in alignment. The entire palette exchange is exclusively driven and controlled by the movement of the sled (14).

9 Claims, 11 Drawing Sheets

View X

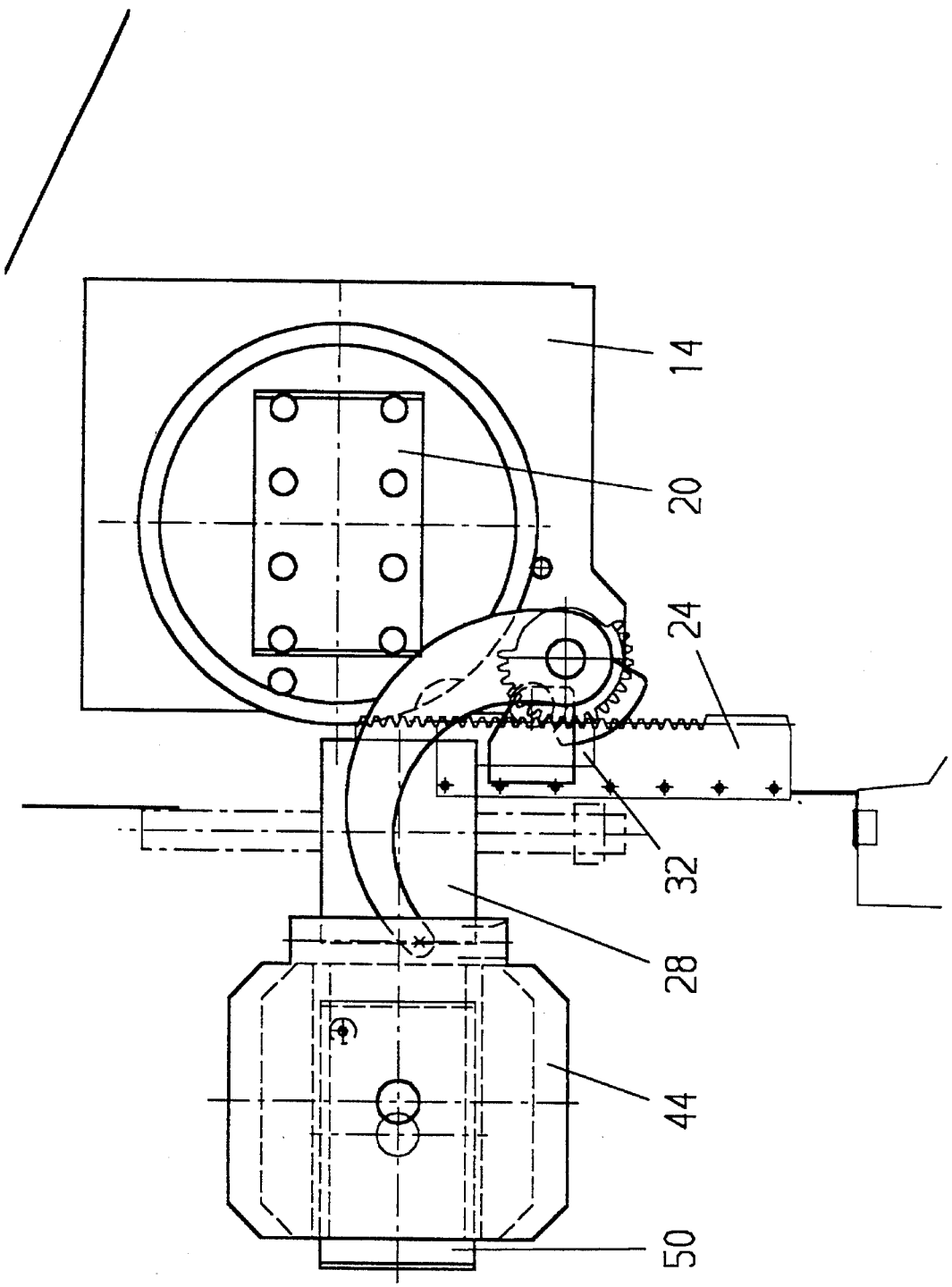

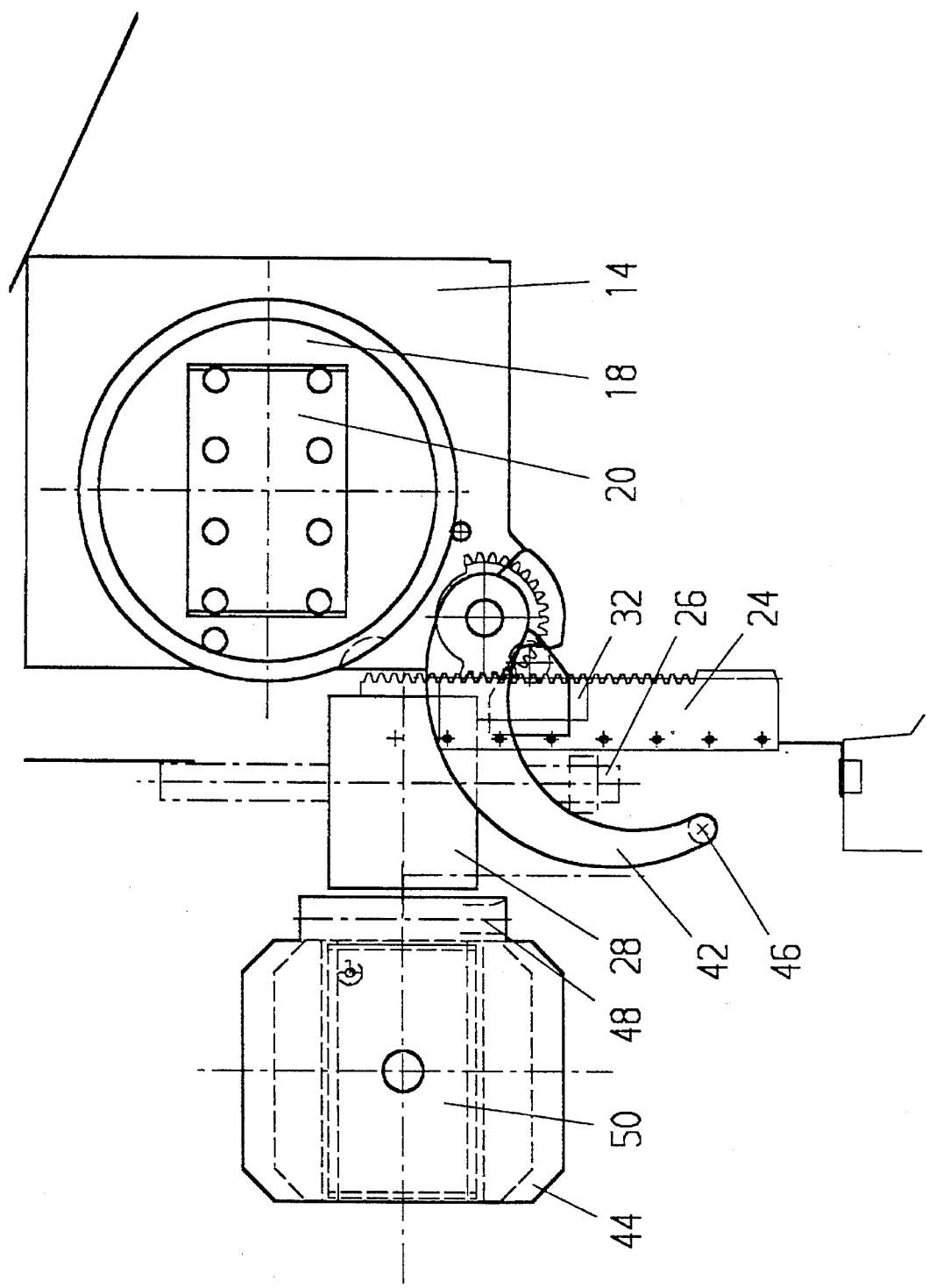

PALETTE CHANGER FOR MACHINE TOOLS

BACKGROUND OF THE INVENTION

1. Field of the Invention

The invention concerns a palette changer for machine tools wherein a palette is pushed by means of a swing arm from the palette receiver of a sled, over a bridge table, and onto a transfer station. The palette changer can achieve a change of palettes with minimal idle time and utilizes a palette receiver which is slidable in a single direction.

2. Description of the Related Art

A palette changer of this category is known from EP 0 281 664 B1. With this type of known palette changer, a palette receiver slidable in the X-direction is provided upon a sled which is slidable in the Y-direction. On the palette receiver, a swing arm is mounted pivotable about an axis perpendicular to the X-Y-plane. A pinion mounted on the axis of the swing arm engages with a rack mounted on the sled in order to swing the swing arm, when the palette receiver is slid upon the sled in the X-direction. The swing arm engages with a roller provided on its free end in a groove in the palette, in order to slide the palette during the swinging movement of the swing arm. For a palette exchange the palette receiver is hydraulically raised, in order axially to slide the pinion of the swing arm and to bring it into engagement with the rack. Thereafter, the palette receiver is slid in the X-direction whereby the palette is slid from the palette receiver with high speed in the X-direction in correspondence to the radius relationship of the swing arm and pinion. As soon as the palette with its work pieces to be processed is slid from the palette receiver to a holding position A, the sled is pushed in the Y-direction in order that the swing arm with its roller is brought into engagement with a palette with unprocessed work pieces which are to be found in a holding position B. Thereafter, the palette receiver is again pushed back in the X-direction whereby the swing arm is pivoted back and shoves the palette with its unprocessed work pieces onto the palette receiver. By lowering of the palette receiver the palette is tensioned and indexed.

The lifting off of the palette receiver for the palette exchange and for the engagement of the pinion of the swing arm complicates the construction. The palette changer pushes the palette from the palette receiver to an immediately adjacent first waiting position and takes over the palette from a likewise immediately adjacent second waiting position, whereby the two waiting positions are positioned in a common plane next to each other. The spatial separation of the waiting positions from the working room of the two machines is inadequate. Besides this the necessity of two waiting positions situated on the same plane adjacent to each other compromises the flexibility of the construction of the work tools and in the utilization possibilities of a palette storage. Finally, the palette changer requires movement of the palette receiver in two axis, namely in X-direction and the Y-direction, so that the palette changer is not suitable for work machines, such as for example processing centers, in which the palette reception is only slidable in a single spatial axis, because the movement in the other two spatial axes is taken up by the travel path of the work tools.

SUMMARY OF THE INVENTION

The invention is concerned with the objective of providing a palette changer which can achieve a change of palettes with minimal idle time utilizing a palette receiver which is slidable spatially in a single direction, and which is flexible with respect to the junction to the palette supply means.

This object is inventively solved in accordance with a palette changer for machine tools wherein a palette is pushed by means of a swing arm from the palette receiver of a sled, over a bridge table, and onto a transfer station. The sweeping movement of the swing arm is driven by means of a pinion which engages a fixed rack. The bridge table is transported along with the sled so that the palette guide of the sled and the bridge table during the sliding of the sled are constantly in alignment. The entire palette exchange is driven and controlled by the movement of the sled.

BRIEF DESCRIPTION OF THE DRAWING

In the following the invention is described in greater detail with reference to the embodiments represented in the drawings, wherein there is shown.

DETAILED DESCRIPTION OF THE INVENTION

Figure 1:
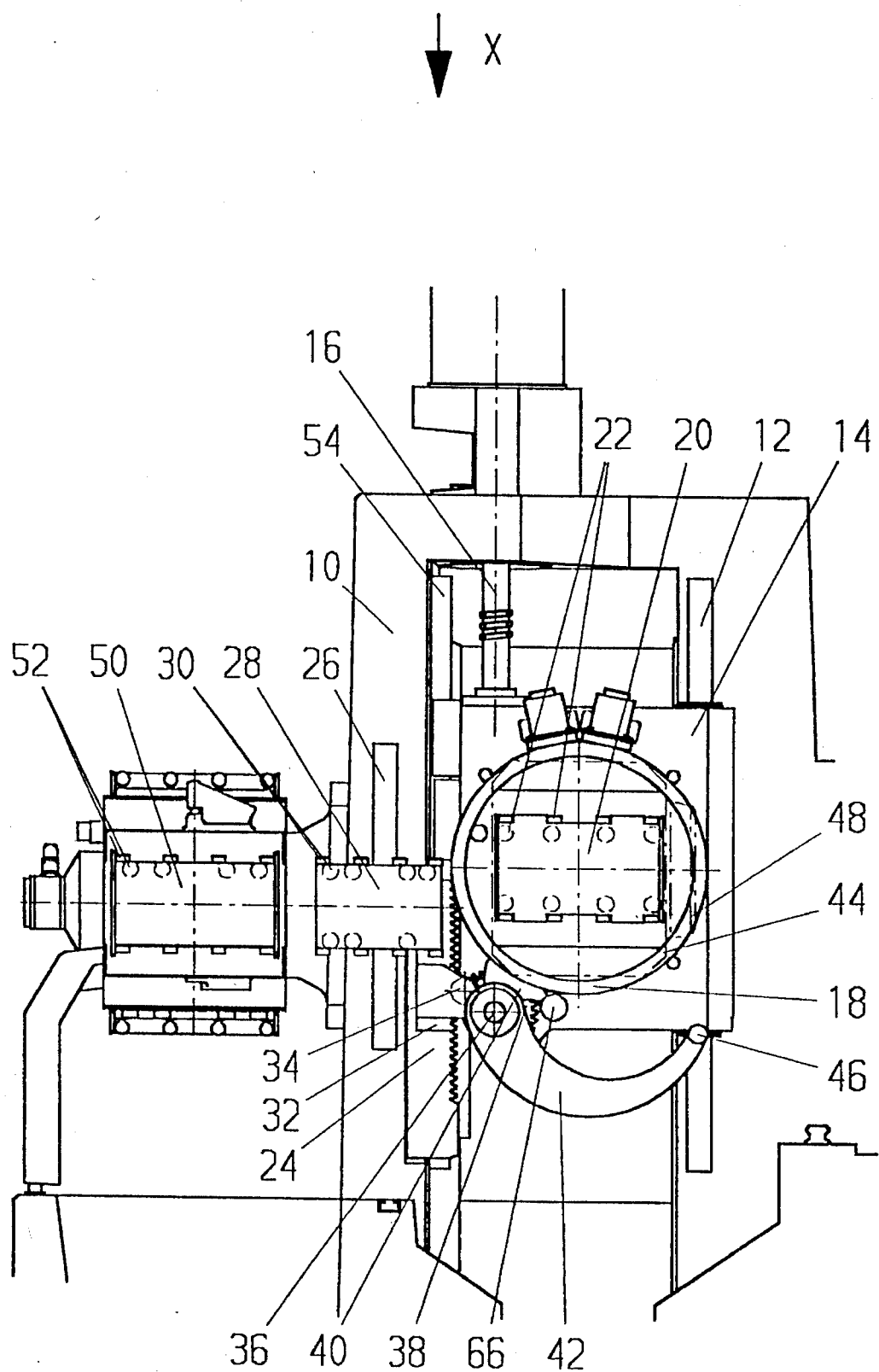
FIG. 1 A frontal view of the palette changer.

In the palette changer according to the present invention the palette receiver is mounted on a single spatial axis slidable sled. The movement of the sled is used for the driving of the pivot arm whereby the swing arm moves the palette from the palette receiver perpendicularly to the movement axis of the sled. A bridge table is synchronously taken along with the sliding of the sled so that the palette during the movement of the sled is slid from the palette receiver onto the bridge table. As soon as the palette is completely slid onto the bridge table, the same arrives at it's transfer position, in which it's palette guide is aligned with the palette guide means of the transfer station. In this delivery position, the bridge table is held securely so that the palette can be transferred from the bridge table to the transfer station, for which the sled is transported further and the swing arm is pivoted further.

The accommodation of the palette on the bridge table and the transfer of the palette from the bridge table to the transfer station makes possible a greater distancing of the transfer station from the work area of the work machine, in which the palette receiver of the sled is to be found. In particular, there is produced a great constructive freedom in the design of the transfer station. In particular, the transfer station can be a station of a palette accumulator or a chain system, so that a high flexibility in the utilization of the work tool machine and the palette delivery system results.

The entire driving and the entire controlling of the palette changer result mechanically via the drive of the sled movement, so that the palette changer does not require any additional drive motor nor any additional controller. As a result the construction expenditures are held to a minimum.

In the embodiment shown in the drawings the palette changer is shown in combination with a work center, in which the workpiece table with its horizontal axis is vertically movable to a stand (Xaxis) and the workpiece spindle is horizontally mounted in a head stock which is movable in the two horizontal axes (Y-axis and Zaxis).

On the stand 10 a sled 14 is vertically transportable on guide rails 12. The sled 14 is driven via the spindle 16 by means of an electromotor.

In the sled 14 a round table or round switch table is mounted pivotally about a horizontal axis. The round table, or as the case may be, round switch table is provided with a plate 18, on the front side of which a palette receiver 20 is provided. The palette receiver 20 is provided with a palette guide 22 and a palette indexer. The palette guide 22 is provided with ball bearing rollers and operates in the normal way for reception of normalized change palettes.

A rack 24 is mounted on the vertical face side of the stand 10, which vertically parallel to the guide rails 12 runs, sideways engages the sled 14 and extends upwards from the lower end position of the sled 14. The teeth of the rack 24 are granted facing towards the sled 14.

Figure 2:
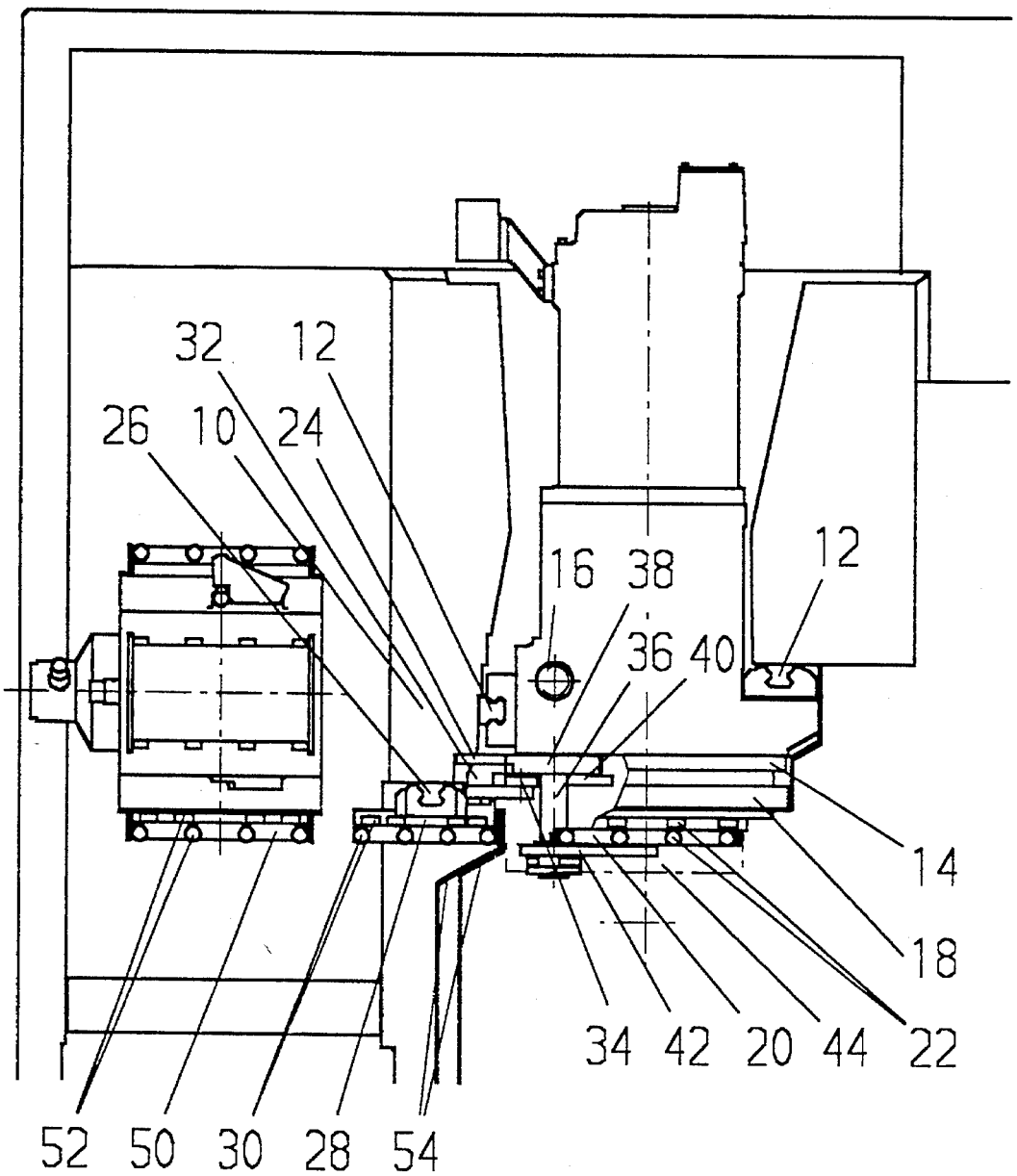
FIG. 2 A partially sectional view according to arrow X in FIG. 1.

Further a vertical bridge guide rail 26 is secured on the vertical face side of the stand 10, which is positioned on the side of the rack 24 opposite that of the side facing the sled 14. On the bridge guide rail 26 a bridge table 28 is vertically slidably provided. The bridge table 28 carries on its vertical face a horizontally oriented palette guide 30, which is designed to correspond to the palette guide 22 of the palette receiver 20. A second vertical rack 32 is mounted on the bridge table 28, which with it's face is positioned in front of the securely mounted rack 24. The teeth of the racks 24 and 32 correspond to each other in tooth shape and tooth position and are so provided that when rack 32 is in the appropriate vertical position they come into registry with each other. Further, there is on the bridge table 28 a frictional roller 34 mounted rotatably about a horizontal axis. The frictional roller 34 is positioned on the bridge table 28 on the face side thereof in front of the rack 32, as can be seen in FIG. 2.

On the lower, rack 24 facing, edge of the sled 14 a shaft 36 is mounted in the sled 14 pivotably about a horizontal axis which is perpendicular to the plane of the sled 14. A pinion 38 is provided on the end of the shaft 36 facing the stand 10, with teeth provided on about two-thirds of the circumference. The teeth of the pinion 38 correspond to the teeth of the racks 24 and 32. The axial breadth and the axial position of the pinion 38 is so constructed that its teeth can come into engagement with the racks 24 and 32. Axially in front of the pinion 38 there is likewise provided, secured against rotation on the axle 36, a cam curve 40, of which the outer circumference is capable of coming into contact with roller 34 of the bridge table 28. On the face of the sled 14 there is mounted, non-rotatingly, on the axle 36 a sickle shaped bowed swing arm 42. The pivot plane of the swing arm 42 lies immediately adjacent to the face of the vertical surface of the sled 14. The swing arm 42 is positioned outward of a palette 44 provided on the palette receiver 20. The swing arm 42 is provided on its free end with a roller 46, which is rotatable about a horizontal axis and which is seated on the side of the swing arm 42 opposite the side of the sled 14. The palettes 44 are provided underneath, on the side perpendicular to the direction of palette guides 22 with a groove 48, in which the roller 46 of the swing arm 42 can engage.

Beside the stand 10 a relay station 50 is provided, which in the illustrated embodiment is a station of a palette storage. The relay station 50 likewise exhibits a horizontally positioned palette conveyor 52 for a normalized palette 44.

Further details of the palette changers can be seen in the following description of the operation, with reference to FIGS. 3-11.

Figure 3:
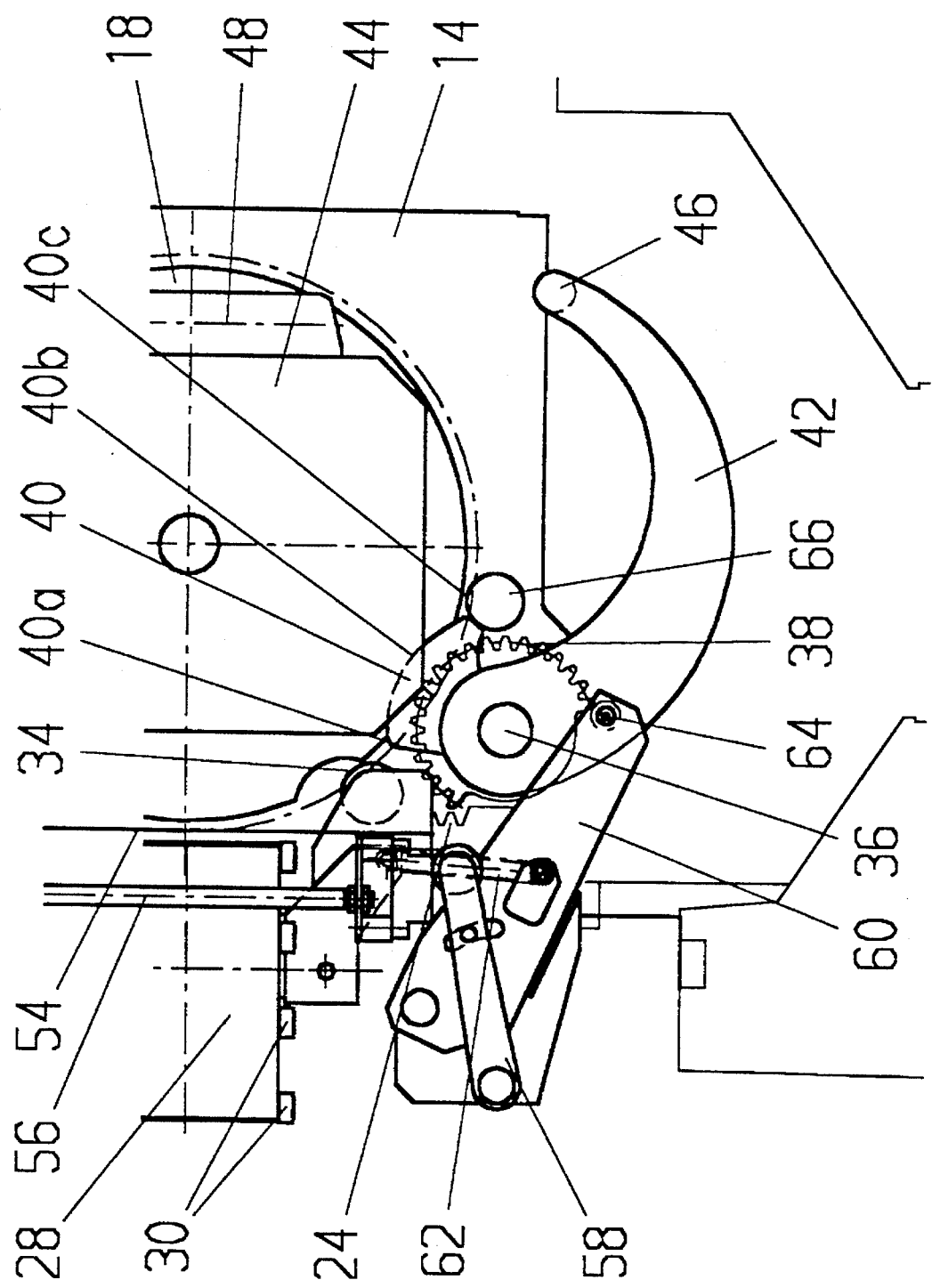
FIG. 3 A detailed representation and frontal view in the basic position of a palette changer, FIG. 4 A representation according to FIG. 3 in the beginning phase of the exchange process, and FIGS. 5-11 The work cycle of the palette changer in a simplified frontal view.

In FIG. 3 an enlarged detail representation of the basic starting position of the palette changer is shown. This is the starting position for receiving the palette changer during the working process.

In the starting position a vertically lowerable door 54 closes off the work room of the work center. The door 54 lowers itself between the sled 14 with the palette receiver 20 and the bridge table 28. The raising and the lowering of the door 54 is accomplished by means of a hydraulic cylinder, of which the piston rod 56 is shown in FIG. 3. The door 54 presses downward with a lower striker against a first lever 58, which thereupon urges a second lever 60 downwards against the force of a pretensioned spring 62 on the stand. On a free end of the second lever 60 there is provided a roller 64, which can come into engagement with the pinion 38. The swing arm 42 rests under it's own weight in this final position, during which its roller 46 is positioned outside of palette 44. In this final position, the swing arm 42 is thereby detained, that a radial edge 40c of the cam 40 abuts against a striker 66 provided on the sled 14. In this final position of the swing arm 42, the teeth of the pinion 38, which extend only over a portion of the circumference, are out of engagement with the rack 24 mounted on the stand. The sled 14 can thus, for the work processing, be raised and lowered without hindrance, without any engagement of the rack pinion 38 in the racks 24 and 32. The door 54 detains the levers 58 and 60 in such a position, that the roller 64 of the lever 60 is yet out of engagement with the pinion 38, while the sled is still in its lowest position as shown in FIG. 3.

Figure 4:
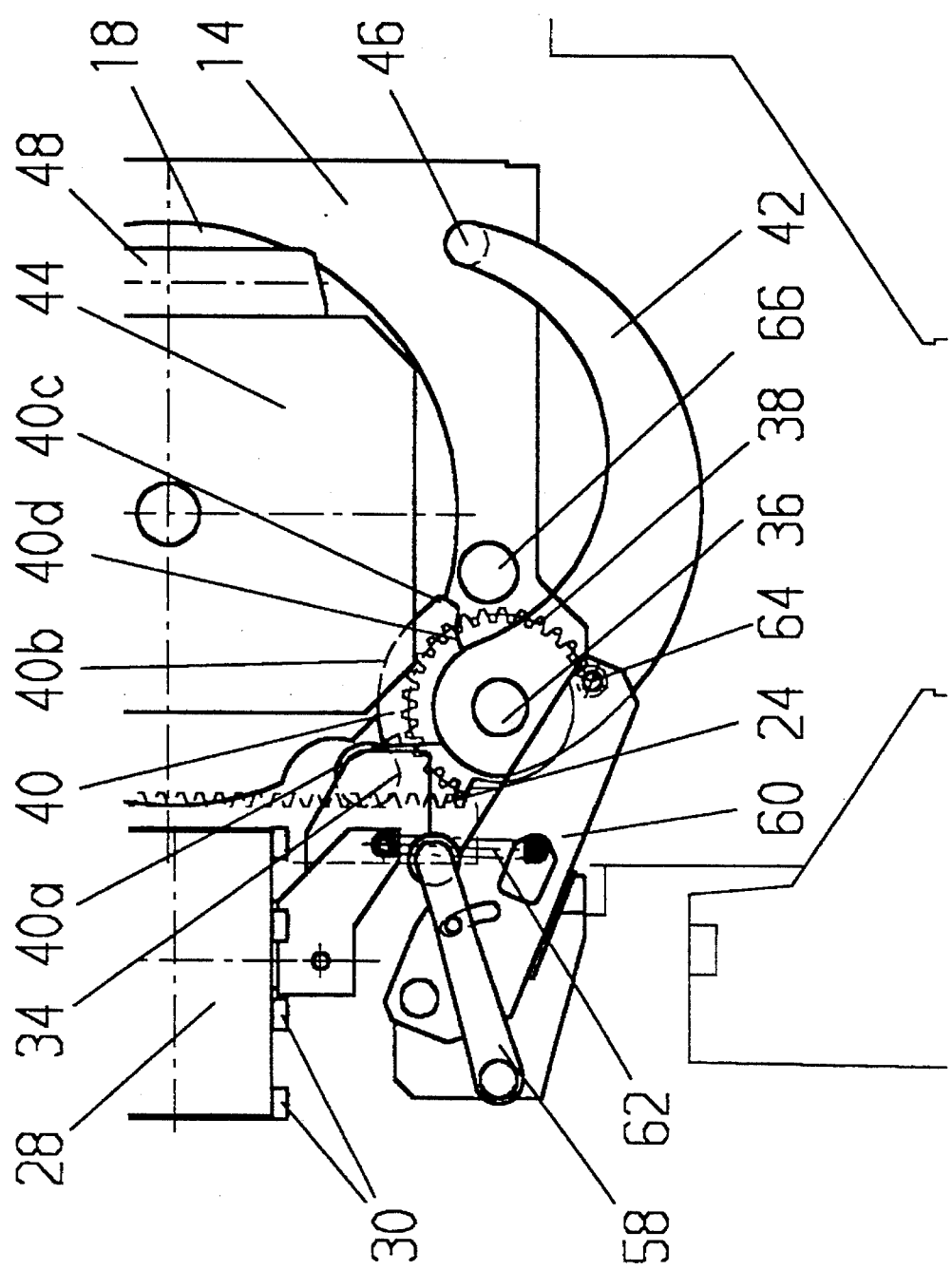

Should the palette, which is to be found on the palette receiver 20 of the sled 14, be exchanged, then first the sled 14 is transported to its lowest position as shown in FIG. 3. The entire device at this time takes the position as shown in FIG. 3. Next the door 54 which had been closing off the work room is opened upwardly. Thereby the striker of the door 54 is lifted off of the first lever 58 and releases it. The pre-tensioned spring 62 can now pull the second lever 60 upwardly (in the drawing, in the counterclockwise direction). Thereby the roller 64 of the second lever 60 is pressed under the pressure of the spring 62 against the tooth flank of the first tooth of the pinion 38, as shown in FIG. 4. The swing arm 42 is thereby in the counterclockwise direction pivoted out of its starting position, the cam 40 is freed from the striker 66 and the pinion 38 engages, in the counterclockwise direction, with its last tooth with the rack 24 fixed to the stand. This situation is represented in FIG. 4.

Figure 5:
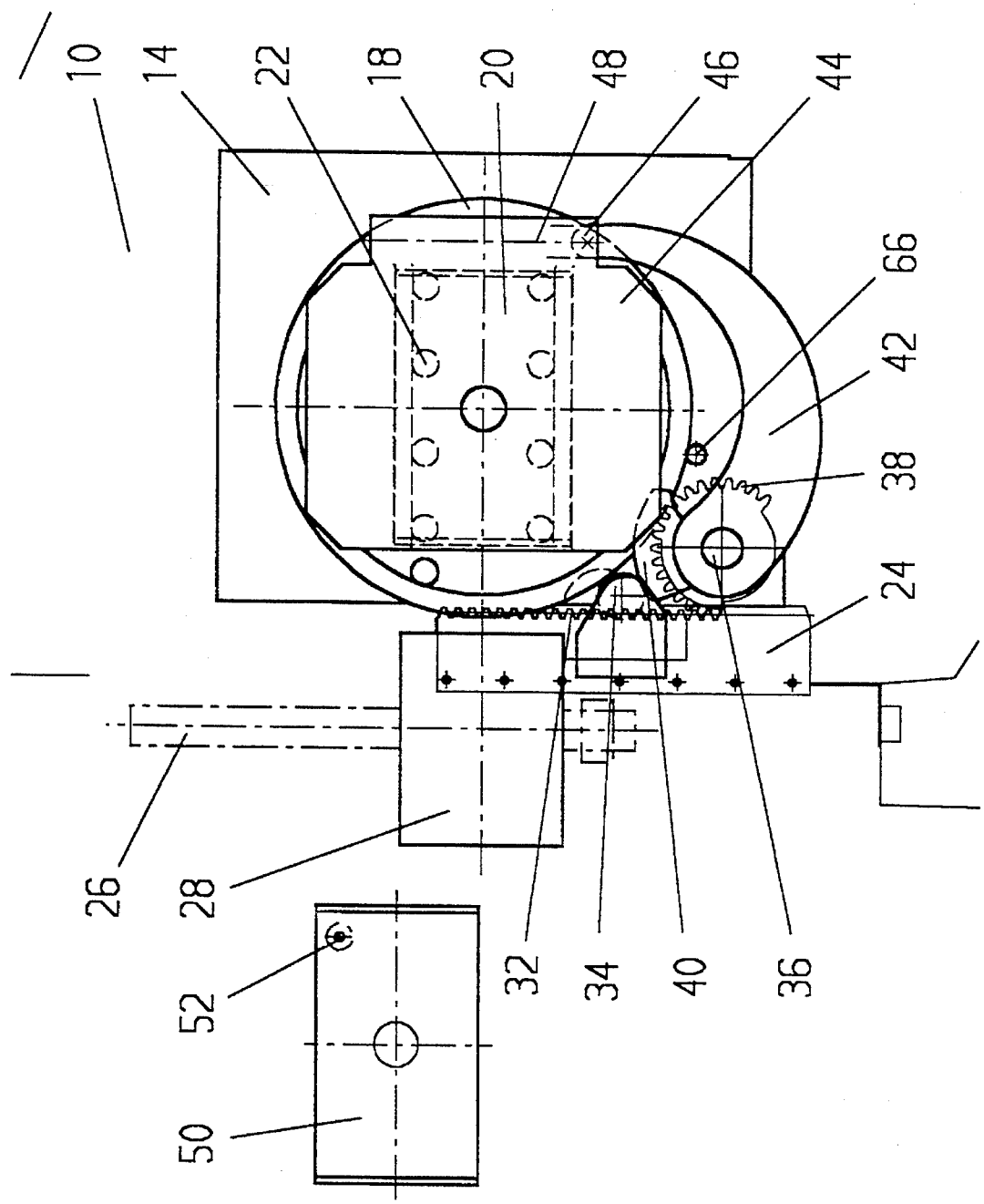

Now the sled 14 is transported upwards. Thereby the swing arm 42 is pivoted in the counterclockwise direction, since the pinion 38 comes into engagement with the rack 24 fixed to the stand. As a result of this pivoting of the pivot arm 42 the leading radial edge 48 of the drive cam 40 reaches to the roller 34 and the cam 40 turns itself under the roller 34, so that the roller 34 supports itself on a circumference section 40b of the cam 40 which extends with constant radius concentric to the axle 36. The swing arm 42 is pivoted further, whereby its roller 46 engages from underneath in the groove 48 of the palette 44. This situation is shown in FIG. 5.

Figure 6:
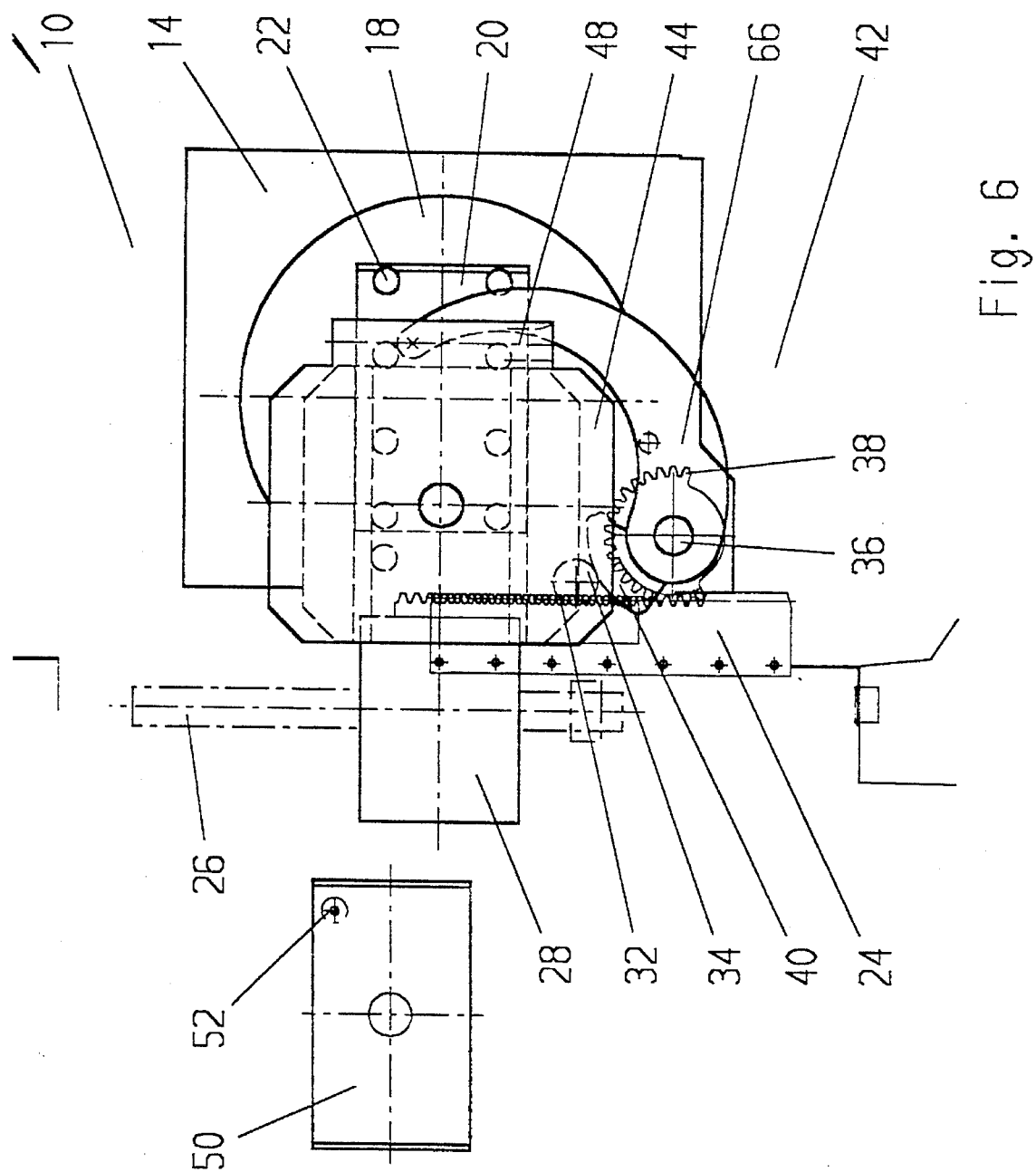

Upon the further transporting of the sled 14 upwardly, the bridge table 28 is, synchronously with the sled 14, taken along and pushed upwardly on its ridge guiding track 26, since its roller 34 is supporting itself on the concentric circumscribing section 40b of the cam 40. The swing arm 42 is pivoted further in the countercurrent direction and pushes thereby the palette 44 (in the figure towards the left) from the palette guide 22 of the palette receiver 20 onto the palette guide 30 of the bridge table 28. This sliding is possible during the movement of the sled 14 upwardly, since the bridge table 28 is moved together with the sled 14 and thereby the palette guide 22 of the palette receiver 20 and the palette guide 30 of the bridge table 28 remain in alignment. The sickle shaped design of the swing arm 42 makes it possible, that the swing arm 42 during this swing movement is caused to move around the right lower corner of the palette 44 and the palette 44 does not hinder the movement of the swing arm 42. This situation is represented in FIG. 6.

Figure 7:
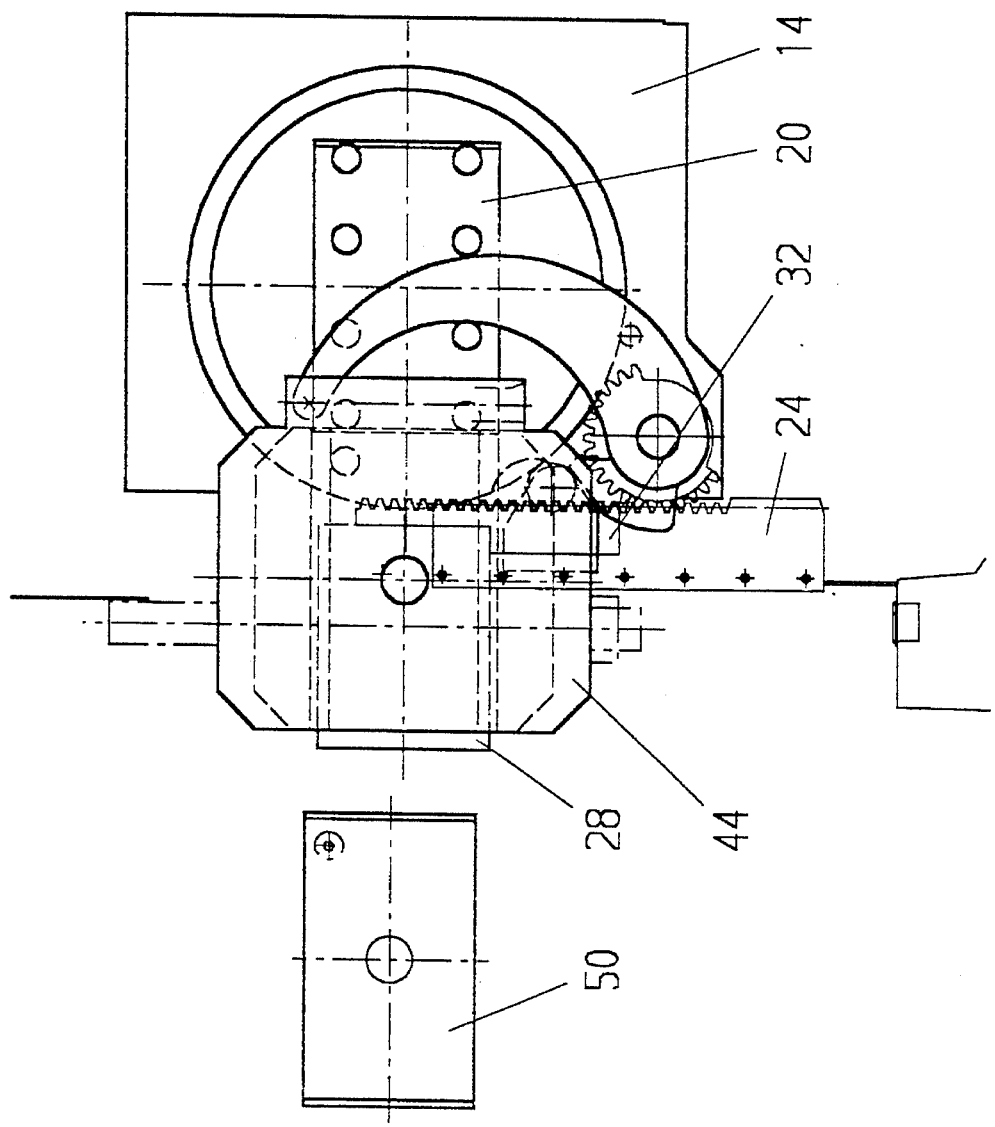

As soon as the sled 14 is shoved so far upwards, that the palette guides 22 of the palette receiver 20 and the palette guides 30 of the bridge table 28 attain the same height as the palette guides 52 of the transfer station 50, the cam 40 together with the swing arm 42 has rotated so far, that the roller 32 comes into engagement with the end of the concentric circumscribing section 40b of the cam. The palette 44 is thereby almost completely pushed from the palette receiver 20 onto the bridge table 28. This situation is represented in FIG. 7.

Figure 8:
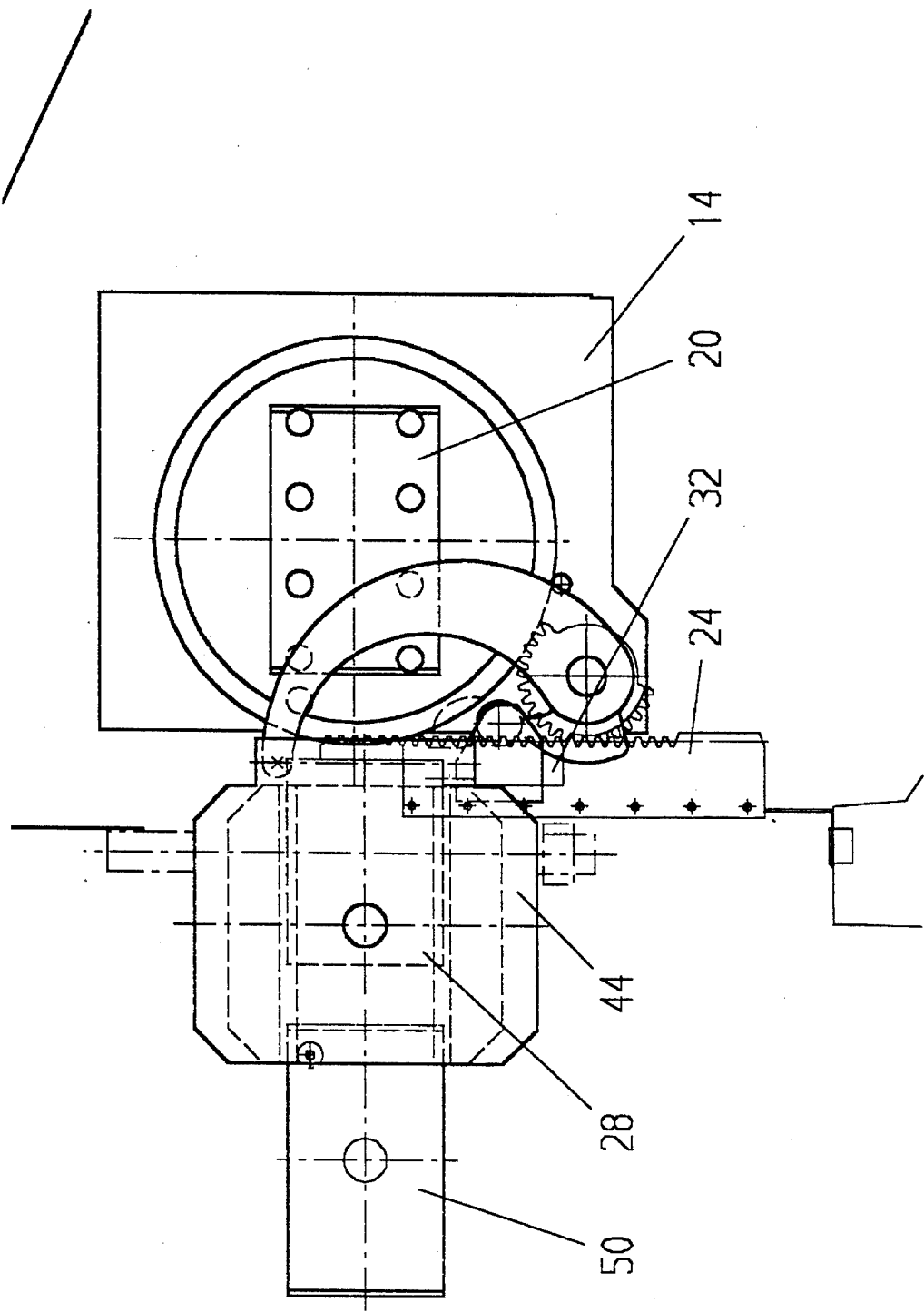
Figure 9:
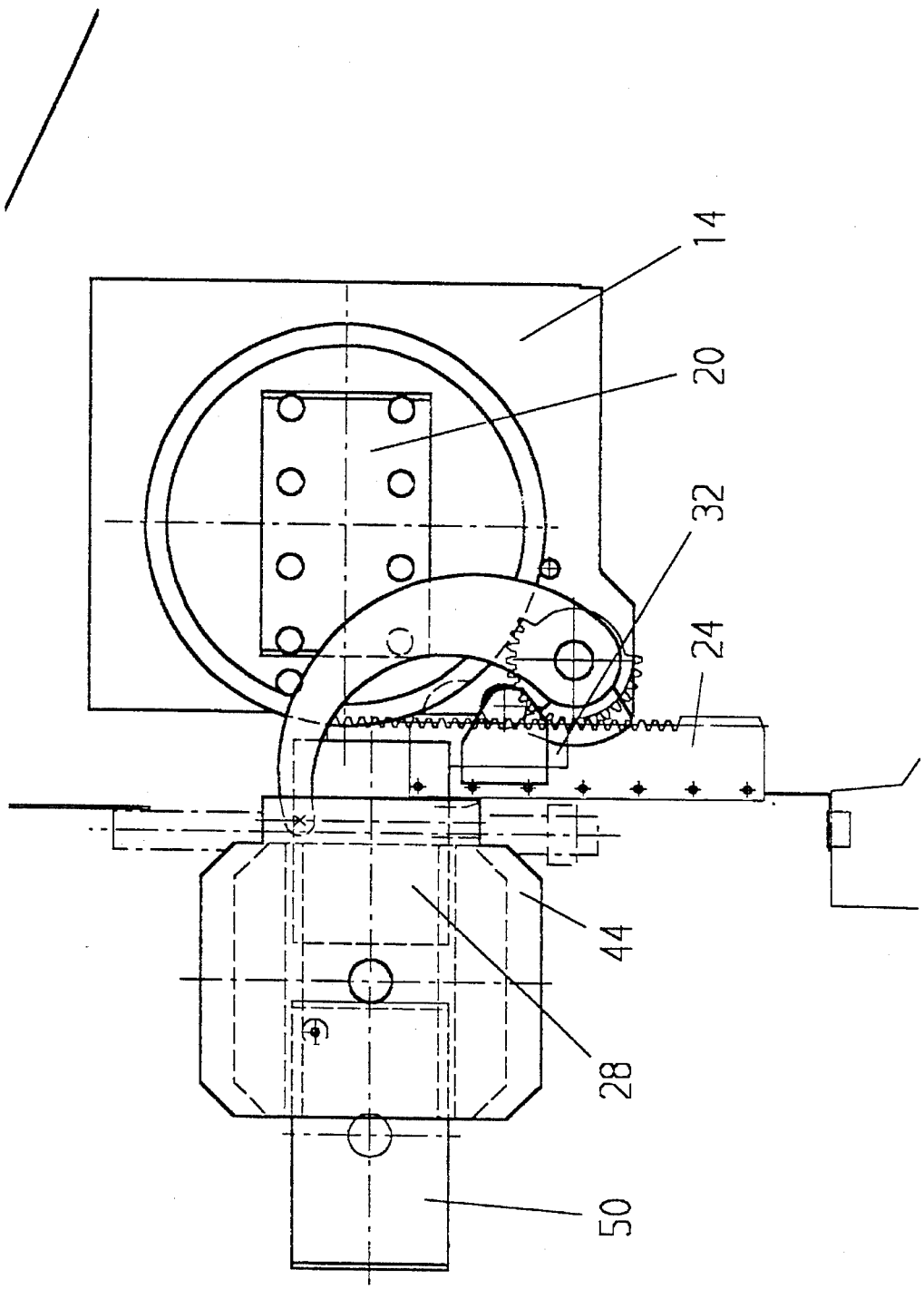

When the sled 14 and the bridge table 28 have arrived at the transfer station, in which the palette guide 44 of the palette receiver 20, the palette guide 30 of the bridge table 28 and the palette guide 52 of the exchange station 50 are exactly aligned, then the palette 44 is pushed completely onto the bridge table 28 and completely disengaged from the palette guide 22 of the palette receiver 20. The cam 40 has rotated so far, that its concentric circumscribing section 40b under the roller 34 is turned away and the roller 34 comes into engagement with an essentially radial section 40c of cam 40. The shape of the radial section 40c of cam 40 is so selected, that during the further movement of the sled 14 upwardly, the roller 34 is not urged upwards any further and the bridge table 28 maintains its vertical position, in which it's palette guide 30 aligns with the palette guide 52 of the exchange station 50. Since the bridge table 28 now is not pushed any further upwards, the rack 32 mounted on the bridge table 28 also remains stationary and the pinion 38 now also comes into engagement with this rack 32. This situation is shown in FIG. 8.

During the further transporting of the sled 14 upwardly the swing arm 42 is pivoted further in the counterclockwise direction and pushes now the palette 44 from the bridge table 28 onto the palette guide 52 of the exchange station 50. In this rotating the roller 34 moves from the radial section 40c of the cam 40 to a back sectional section 40d of the cam 40. This situation is presented in FIG. 9.

The sled 14 is transported further upwardly. The swing arm 42 pushes the palette 44 from the bridge table 28 completely onto the palette guide 52 of the transfer station 50. The drive roller 34 now finds itself in the vicinity of the rear sectioned section 40d of the drive curve 40 and is thereby free of the drive curve 40 and is no longer supported thereby. The movement of the sled 14 upwards thus no longer takes the bridge table 28 along. The pinion 38 is in engagement with both the stand mounted rack 24 as well as with the bridge table 28 mounted rack 32. The racks 34 and 32 are held in registry by means of teeth of pinion 38 and the bridge table 28 is fixed with respect to the stand 10 in that position, in which its palette guide 30 is aligned with the palette guide 52 of the transfer station 50. The situation is represented in FIG. 10.

During the further movement of the sled 14 upwards the pivot arm 42 is further pivoted in the counterclockwise direction by means of the rack 24 engaging pinion 38. Thereby the roller 46 of the swing arm 42 emerges downwards out of the groove 48 of the palette 44, as soon as the palette 44 is pushed completely onto the transfer station 50. The swing arm 42 is further pivoted, until its end position is reached, at which time it is beyond the range of travel of the palette storage. This situation is shown in FIG. 11.

Now the palette storage can be switched further, so that the taken over palette 44 with the workpiece to be worked on is moved out of the transfer station 50 and a new palette with unprocessed work pieces is placed into the transfer station 50. Thereupon the sled 14 is again moved downwards, as a result of which the rack 24 engaging pinion 38 pivots the swing arm 42 in the opposite, in the clockwise direction. The roller 46 of the swing arm 42 engages from underneath into the groove 48 of the palette 44, which now is located in the transfer station 50. During the further downward movement of the sled 14 the above-described process runs in the reverse direction and the palette 44 is pushed over the bridge table 28 again on the palette receiver 20 of the sled 14, whereby the sled 14 and the bridge table 28 again in tandem move downwards, as soon as the palette 44 is completely received by the bridge table 28 and released from the palette guide 52 of the transfer station 50. When the palette 44 is completely transferred onto the palette receiver 20 of the sled 14, the palette 44 is tensioned onto the palette receiver 20 and indexed. The sled 14 is transported completely downwards, so that pinion 38 comes out of engagement with rack 24. Then the door 54 is moved downwards and closed, whereby the levers 58 and 60 are pressed downward and the roller 64 is lifted off of the teeth of the pinion 38. The swing arm 42 falls into its starting position under its own weight, so that the cam 40 abuts on the striker 66. The working process can now begin, during which the sled 14 can be moved vertically up and down unhindered by the palette changer.

Now that the invention has been described, what is claimed is:

1. A palette changer including means for transferring a palette from a palette receiver to a transfer station of a work tool machine, said transfer station provided with a palette guide, said palette changer comprising:

a sled for transporting pallettes;

a palette receiver mounted on said sled, said pallete receiver provided with palette guides for receiving a palette;

an axle mounted rotatably on said sled;

a pinion fixed on said axle and capable of rotation with respect to said sled;

a swing arm mounted fixedly on said axle and capable of rotation with respect to said sled;

a rack fixedly mounted on a work tool machine;

a bridge table (28) positioned between the palette receiver (20) and the transfer station (50);

wherein the palette guide (22) of the palette receiver (20) during the palette transfer is oriented transverse to the direction of travel of the sled (14);

wherein said bridge table (28) is slidable parallel to the direction of travel of the sled (14) and is provided with a palette guide (30) at a right angle to the direction of travel, and said bridge table (28) is transported together with the palette receiver (20) during the palette exchange such that the palette guides (30) of the palette receiver (20) and the bridge table (28) are in alignment;

wherein in the transfer station the palette guides (20 or 30) of the bridge table (28) are in alignment with the palette guides (52) of the transfer station (50); and wherein the engagement of the pinion with the rack during a sliding of the sled pivots the pivot arm in a sweeping motion, said pivot arm engages with a groove of a palette provided on the pallet receiver, and pushes the palette between the palette guide of the palette receiver and the palette guide of the transfer station.

2. A palette changer according to claim 1, wherein bridge table (28) is carried along by the sled (14) via an engagement means (34, 40) during the transporting of the sled.

3. A palette changer according to claim 2, wherein said engagement means (34, 40) between said sled and said bridge table is constructed to disengage as soon as the bridge table (28) reaches the transfer station.

4. A palette changer according to claim 3, wherein the engagement means include a roller (34) associated with the bridge table (28) and a drive cam (40) seated on the axle (36) of the swing arm (42), wherein the drive cam (40) extends outwardly over a limited section (40b) of the circumference with constant radius concentric to the axle (36), and supports the roller (34) on this circumferential section (40b) of the drive cam (40) during the transporting of the bridge table (28).

5. A palette changer according to claim 3, wherein a second rack (32) is provided on the bridge table (28) positioned parallel to the first rack rack (24) provided on the machine, and wherein the engagement of pinion (38) in this rack (32) holds the bridge table in the transfer station as soon as the drive means (34, 40) is out of engagement.

6. A palette changer according to claim 1, wherein pinion (38) is provided with teeth only over a section of its circumference, and wherein in the starting position of the swing arm (42) the pinion (38) faces the rack (24) with its non-toothed circumferential area, so that the pinion (38) is completely out of engagement with the rack (32).

7. A palette changer according to claim 1, wherein swing arm (42) is provided on it's end opposite said axle with a roller (46), said roller constructed for engagement in a groove (48) provided in a palette (44), and wherein said roller (46) enters into the groove the longitudinal direction of the groove (48) and emerges out of this groove (48).

8. A palette changer according to claim 1, further comprising a start-up assembly (58, 60, 62, 64) constructed for swinging the swing arm (42) at the beginning of the palette change operation out of its beginning position such that the circumferential teeth of the pinion (38) come into engagement with the rack (24).

9. A palette changer according to claim 8, further comprising a door (54) for closing off the work room of the processing machine, wherein door prevents the start-up unit (58, 60, 62, 64) from engagement when the door (54) is in its closed condition, and wherein the opening of the door (58) sets the starting up assembly (58, 60, 62, 64) in operation.

* * * * *